3
2,820,791

CHEMICAL MANUFACTURE

David A. Shermer, East Haven, Conn., assignor to Olin Mathieson Chemical Corporation, a corporation of Virginia No Drawing. Application February 10, 1956
Serial No. 564,646

5 Claims. (Cl. 260—290)

This invention relates to the production of 2-chloropyridine.

2-chloropyridine can be made by reacting chlorine and pyridine in the vapor phase. When these materials are reacted alone in the vapor phase, the reaction is difficult to control. Extensive carbonization occurs and a flame sometimes appears in the reaction zone. To combat these difficulties, the reaction has also been carried out with the reactants in admixture with nitrogen. This procedure suffers from the disadvantages, however, that relatively pure nitrogen is uneconomical to use and that the yield of 2-chloropyridine is undesirably low based on the amount of pyridine consumed.

In accordance with the present invention, it has been discovered that 2-chloropyridine can be conveniently prepared in good yield by conducting the vapor phase reaction of chlorine and pyridine in the presence of steam. The use of steam is advantageous as it is inexpensive and is readily available. Moreover, the use of steam simplifies the manufacture because it permits the recovery of pyridine as the pyridine-water azeotrope which can be conveniently recycled through the process. Thus, the invention provides an economical method for the manufacture of 2-chloropyridine.

Accordingly, the method of the present invention comprises carrying out the vapor phase reaction of chlorine and pyridine with these reactants in admixture with steam. At least about 0.25 mole of steam, and preferably from about 0.5 to 2.0 moles of steam, are introduced into the reaction zone per mole of pyridine. I have found that the use of 1 mole of steam per mole of pyridine is very satisfactory and moderates the reaction so that good temperature control can be maintained. There appears to be no upper limit to the amount of steam that can be used other than that imposed by the expense of handling a large amount of material.

The initial relative proportion of the reactants chlorine and pyridine can be varied widely, for example from 0.5 or less to 1.5 or more moles of chlorine per mole of pyridine. The reaction can be carried out at a temperature of 260° to 380° C., and preferably at 325° to 355° C.

In a preferred embodiment of the invention, unreacted pyridine is recovered as a steam-pyridine azeotropic mixture, and this mixture is recycled through the process. In this embodiment, the effluent from the reactor, which contains the 2-chloropyridine and the hydrogen chloride produced and also unreacted pyridine, chlorine and the steam, is subjected to a separation whereby 2-chloropyridine is removed. The residue from this separation is treated to recover therefrom an azeotropic mixture of steam and pyridine (i. e. steam and pyridine in the proportion of about 4 moles of steam per mole of pyridine). This azeotropic mixture is then used as at least part of the pyridine and steam introduced into the reactor.

The reaction of chlorine and pyridine according to the invention can be carried out in a glass reactor containing a porous bed of silicon carbide and provided with means for maintaining the desired reaction temperature within the reactor. The reactants and the steam, preferably preheated to about reaction temperature, are advantageously introduced into the reactor at a rate corresponding to a residence time in the reaction zone of from 1 to 5 seconds.

The method of the invention has been carried out without the use of any reactor packing and also with glass beads as reactor packing. However, better yields have been obtained with the use as reactor packing of a porous, granular material providing a large surface per unit volume, such as alumina, activated carbon, and silicon carbide. To date the best results have been obtained with silicon carbide.

The reactor effluent contains 2-chloropyridine, chlorine, hydrogen chloride, pyridine and steam. In order to separate 2-chloropyridine from this mixture, the 2-chloropyridine and pyridine can be absorbed in an aqueous absorbent and the resulting solution can then be treated to render the 2-chloropyridine amenable to separation by extraction. Following extraction, the 2-chloropyridine can be purified by distillation.

To separate 2-chloropyridine from the reactor effluent in this manner, the reactor effluent is scrubbed with a dilute solution of a halogen acid, for example, hydrochloric acid. When so treated with a halogen acid, the 2-chloropyridine and the unreacted pyridine are absorbed and go into solution as 2-chloropyridine hydrohalide and pyridine hydrohalide. An aqueous alkaline solution, for example a sodium hydroxide solution, is added to the solution of the hydrohalides in an amount sufficient to liberate 2-chloropyridine as free base, but insufficient to liberate pyridine as free base. 2-chloropyridine is then separated by extraction with ether, 2-chloropyridine dissolving in the ether phase. Following extraction, ether is evaporated from the 2-chloropyridine, and the 2-chloropyridine is then purified by distillation.

The residue from the ether extraction is an aqueous phase containing pyridine hydrochloride. This residue can be treated to obtain therefrom a pyridine-steam azeotropic mixture which can be used as at least part of the pyridine and steam fed to the reactor wherein 2-chloropyridine is formed. To do this the extraction residue is first treated with an aqueous alkaline solution, for example an aqueous sodium hydroxide solution, to liberate as free base pyridine from the pyridine hydrohalide. The resulting pyridine solution is then subjected to distillation to recover therefrom the azeotropic mixture of pyridine and steam. This mixture is then recycled through the reactor.

If desired, 2-chloropyridine can be separated from the 2-chloropyridine free base-pyridine hydrochloride solution by subjecting this solution to steam distillation. Upon distillation, 2-chloropyridine is collected as the overhead product. A pyridine-steam azeotropic mixture can be obtained from the resulting distillation residue by treating this residue in the same way in which the residue of the above described ether extraction was treated.

In another modification of the method of the invention, 2-chloropyridine can be recovered from the solution of 2-chloropyridine hydrohalide and pyridine hydrohalide by treating this solution with an aqueous alkaline solution sufficient in amount to raise the pH to 10-11 and thereby liberate both 2-chloropyridine and pyridine as free bases, separating these free bases from their solvent by extraction with ether and then separating this ether phase into ether, pyridine and 2-chloropyridine by distillation.

The following examples describe specific embodiments of the invention.

*Example 1*

A glass tube 2.5 cm. in diameter and packed to a length of 22 cm. with 4–8 mesh (Tyler screen size) granular silicon carbide was used as the reactor. The reactor was positioned with the exit end thereof slightly below the level of the entrance end and was heated during the course of the reaction by an electric tube furnace. The reaction temperature was measured by a thermocouple placed in a thermowell sealed into the reactor wall and reaching into the center of the reaction zone.

A pyridine and water mixture formed of 2.36 moles pyridine and 2.36 moles of water was pumped with a Micro bellows pump set to deliver at a pre-determined rate from a graduated addition funnel into an electrically heated vaporizer and pre-heater. The vapor mixture was heated to 345–355° C. (reaction temperature) and was then conducted to a point along the axis of the reaction tube just short of the packed section and there released into the reactor. At the same time, 2.1 moles chlorine gas was metered from a cylinder by means of a needle valve and rotameter and was heated to 345–355° C. The chlorine gas was then conducted into the reactor and released at a point in the reactor short of the point where the pyridine-water mixture was released. Thus some mixing of the reactants occurred before the reactants came in contact with the reactor packing.

During the reaction, the reaction temperature was maintained at 345–355° C. The total reaction time was 5 hours, 37 minutes. The average residence time of the gases in the portion of the reactor packed with silicon carbide was 3.5 seconds.

The reactor effluent was quenched and scrubbed with cold aqueous hydrochloric acid by countercurrent contacting in a glass column packed with glass beads. In the course of this scrubbing, 2-chloropyridine and pyridine was absorbed in the hydrochloric acid solution and formed therein 2-chloropyridine hydrochloride and pyridine hydrochloride. The solution of the hydrochlorides was adjusted to a pH of 3 by the addition thereto of aqueous sodium hydroxide. At this pH, chloropyridine exists primarily as the free base while pyridine is largely in the form of its hydrochloride. The chloropyridine, pyridine-hydrochloride solution was then subjected to an extraction operation in which ether was mixed with the solution and chloropyridine dissolved in the ether phase. The ether was then evaporated from the ether, 2-chloropyridine solution and the 2-chloropyridine was then purified by distillation.

The residue from the ether extraction which contains pyridine hydrochloride was adjusted to pH 10 to 11 by addition thereto of aqueous sodium hydroxide. At this pH pyridine exists mainly as the free base. The resulting pyridine solution was then subjected to distillation and the water-pyridine azeotrope was removed as a gas. This azeotropic mixture can be used as part of the feed to the reactor.

The purified 2-chloropyridine boiled at 83–84° C. at 42–43 mm. of Hg and had an index of refraction $n_D^{25} = 1.5308$. The literature value for these constants are B. P. at 15 mm. of Hg, 62–63° C., and $n_D^{20} = 1.5322$. The yield of 2-chloropyridine was 93.9 g. or 38 percent of theory. 31 percent of the pyridine was recovered unchanged. The yield of 2-chloropyridine based on pyridine consumed was 55 percent. Some 2,6-dichloropyridine was also isolated in this example.

*Example 2*

In this example the equipment described in Example 1 was used. 1.18 moles of pyridine, 1.18 moles of steam and 0.94 mole of chlorine were reacted at 345–355° C. over a period of 2 hours and 30 minutes. The residence time in the silicon carbide bed was 3.1 seconds. The crude 2-chloropyridine fraction isolated by distillation of the reactor effluent boiled at 166°–176° C. at 1 atmosphere (literature value at 1 atmosphere, 170° C.) and had an index of refraction $n_D^{25} = 1.5319$. This product contained some dichloropyridine but amounted to a 48 percent pass yield of crude 2-chloropyridine. 35.5 grams of pyridine was recovered. The yield of crude 2-chloropyridine based on pyridine consumed was 77 percent.

The amount of chloropyridines other than 2-chloropyridine produced by the method of the invention depends on the conditions under which the reaction is carried out. In general more 2,6-dichloropyridine is produced at reaction temperatures in the upper part of the range of 260° to 380° C., and more 3-chloropyridine is produced at reaction temperatures in the lower part of this range. As stated hereinbefore, the preferred range for the production of 2-chloropyridine is 325° to 355° C.

2-chloropyridine can be used as a fungicide as is disclosed by Scheffer and Duncan, Industrial and Engineering Chemistry 38, 619–21 (1946).

I claim:

1. A method of making 2-chloropyridine which comprises reacting chlorine and pyridine in vapor phase and in admixture with steam, at least about 0.25 mole of steam being introduced into the reaction zone per mole of pyridine.

2. A method of making 2-chloropyridine which comprises reacting chlorine and pyridine in vapor phase and in admixture with steam at a temperature of 260° to 380° C., the initial relative proportion of the reactants being about 0.5 to about 1.5 moles of chlorine per mole of pyridine and the initial relative proportion of steam to pyridine being from 0.5 to 2.0 moles of steam per mole of pyridine.

3. A method of making 2-chloropyridine which comprises reacting chlorine and pyridine in the vapor phase and in admixture with steam and in the presence of silicon carbide at a temperature of 260° to 380° C., the initial relative proportion of the reactants being about 0.5 to about 1.5 moles of chlorine per mole of pyridine and the initial relative proportion of steam to pyridine being from 0.5 to 2.0 moles of steam per mole of pyridine.

4. A method of making 2-chloropyridine by reacting chlorine and pyridine in the vapor phase, said method comprising introducing into a reactor said reactants and steam, the initial relative proportion of the reactants being about 0.5 to about 1.5 moles of chlorine to 1 mole of pyridine and the initial relative proportions of steam to pyridine being at least 0.25 mole of steam to 1 mole of pyridine, maintaining the temperature within the reactor at 260° to 380° C., separating 2-chloropyridine formed in the reactor from the reactor effluent and recovering from the residue of said separation pyridine and steam as the azeotropic mixture thereof, and using said azeotropic mixture as at least part of the pyridine and steam introduced into said reactor.

5. A method of making 2-chloropyridine by reacting chlorine and pyridine in the vapor phase, said method comprising introducing into a reactor said reactants and steam, the initial relative proportion of the reactants being 0.5 to 1.5 moles of chlorine to 1 mole of pyridine and the initial relative proportion of steam to pyridine about 0.5 to 2.0 moles of steam to 1 mole of pyridine, maintaining the temperature within the reactor at 325° to 355° C., contacting the reactor effluent with an aqueous hydrochloric acid solution whereby unreacted pyridine and 2-chloropyridine formed during the reaction are absorbed by said solution and form therein a solution of pyridine hydrochloride and 2-chloropyridine hydrochloride, adding to the solution of hydrochlorides aqueous sodium hydroxide in amount sufficient to liberate as free base only 2-chloropyridine, separating liberated 2-chloropyridine from the 2-chloropyridine-pyridine hydrochloride solution and recovering from the resulting residue pyridine and steam as the azeotropic mixture thereof, and using said azeotropic mixture as at least part of the pyridine and steam introduced into said reactor.

References Cited in the file of this patent

UNITED STATES PATENTS

| 1,963,761 | Prahl | June 19, 1934 |
| 1,977,662 | Wibaut et al. | Oct. 23, 1934 |

OTHER REFERENCES

Wibaut et al.: Rec. trav chim., vol 58, pp. 709–21 (1939).